Nov. 30, 1965  J. B. WILMETH  3,220,500
AUTOMATIC BALE WEIGHT CONTROL UNIT
Filed Dec. 20, 1963  3 Sheets-Sheet 1

John B. Wilmeth
INVENTOR.

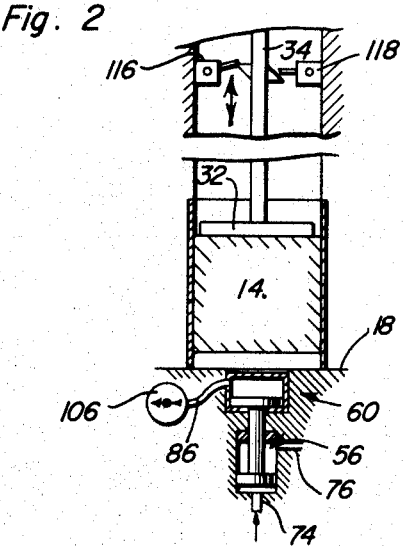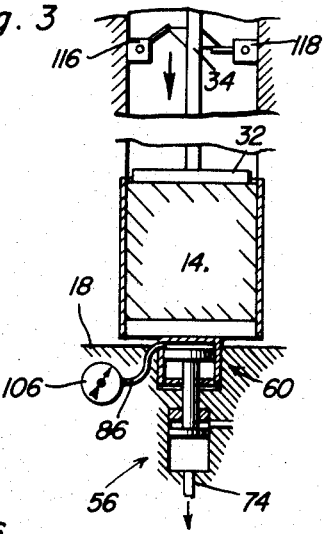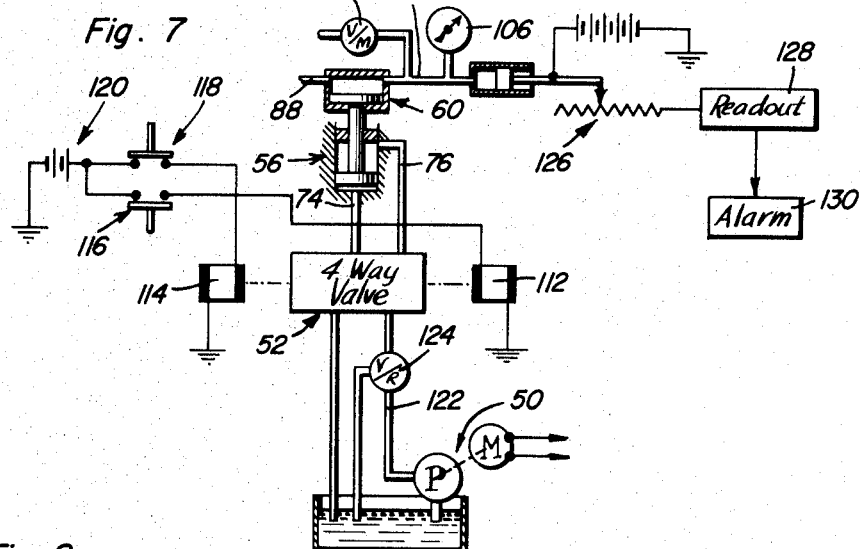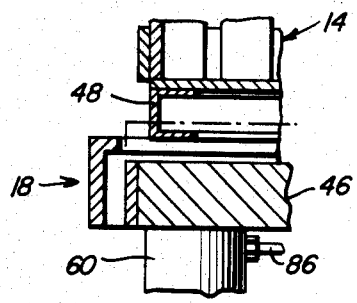

Nov. 30, 1965  J. B. WILMETH  3,220,500
AUTOMATIC BALE WEIGHT CONTROL UNIT
Filed Dec. 20, 1963  3 Sheets-Sheet 3
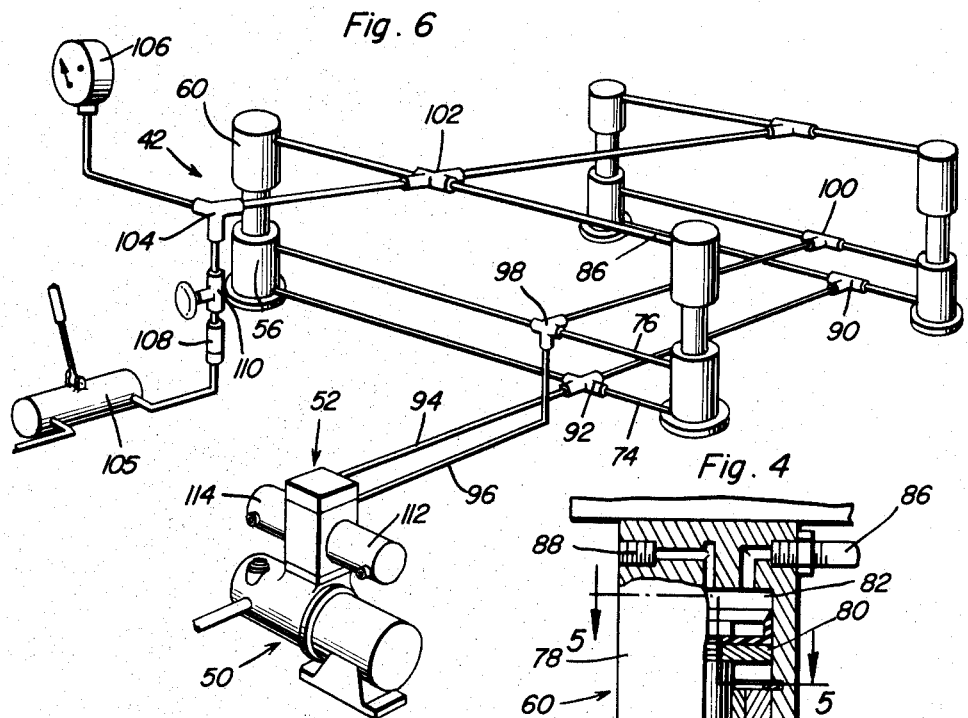
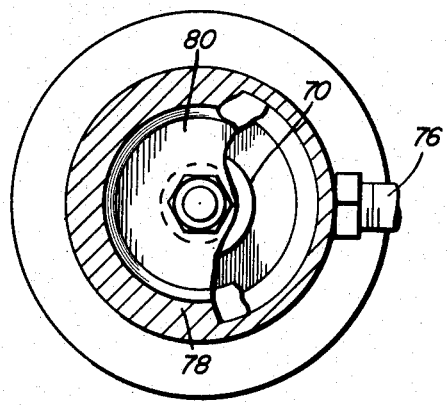
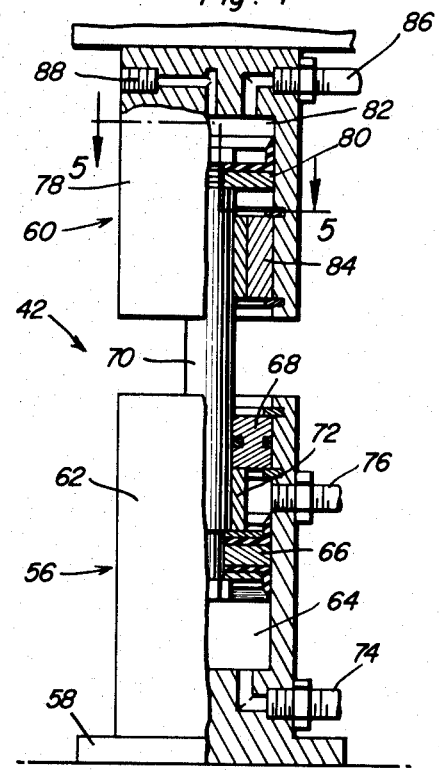
John B. Wilmeth  INVENTOR.

United States Patent Office 3,220,500
Patented Nov. 30, 1965

3,220,500
AUTOMATIC BALE WEIGHT CONTROL UNIT
John B. Wilmeth, 6020 Orlando, Lubbock, Tex., assignor of one-half to A. R. Brownfield, Jr., executor of the estate of A. R. Brownfield, deceased
Filed Dec. 20, 1963, Ser. No. 332,197
7 Claims. (Cl. 177—209)

This invention relates to cotton baling machines and more particularly to a novel method and apparatus incorporated in such machines for weighing the cotton bales prior to baling thereof.

The weighing apparatus of the present invention is applicable to cotton gin balers of various types wherein ginned lint cotton is controllably loaded into a box after which it is compressed by a tramper and then pressed to bale size by the baling ram of a baling press to be finally tied. The requirement for uniform weight bales has created the need for some weighing mechanism in order to enable the operator of the cotton baler to gauge the weight of the lint cotton loaded into the empty baling box or container. Various types of mechanical and hydraulic weighing devices have been heretofore proposed so as to weigh the baling box when filled with lint cotton. These weighing devices however, could not provide any accurate weight measurement nor be readily recalibrated in accordance with different weight requirements. The weighing apparatus and method of the present invention therefore, overcomes these latter shortcomings of prior weighing devices.

It is therefore a primary object of the present invention to provide an apparatus for weighing the ginned lint cotton loaded into a baling box after it has been tramped in a novel and accurate manner.

Another object of the present invention is to provide a weighing device for the lint cotton which will avoid any weight measurement error otherwise introduced by the action of the tramping ram on the lint cotton.

A further object of the present invention is to provide a weighing apparatus for cotton baling machines which may be readily recalibrated in accordance with different weight requirements for the bales.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a diagrammatic view illustrating the operational principles underlying the present invention.

FIGURE 3 is a diagrammatic view similar to FIGURE 2 illustrating the apparatus in another phase.

FIGURE 4 is an enlarged elevational view of one of the elevating assemblies with parts broken away and shown in section.

FIGURE 5 is a transverse sectional view taken substantially through a plane indicated by section line 5—5 in FIGURE 4.

FIGURE 6 is a perspective view of the parts and arrangement associated with the weighing apparatus of the present invention.

FIGURE 7 is a schematic circuit diagram illustrating the operational mode of the present invention.

FIGURE 8 is an enlarged partial sectional view taken substantially through a plane indicated by section line 8—8 in FIGURE 1.

Figure 1:
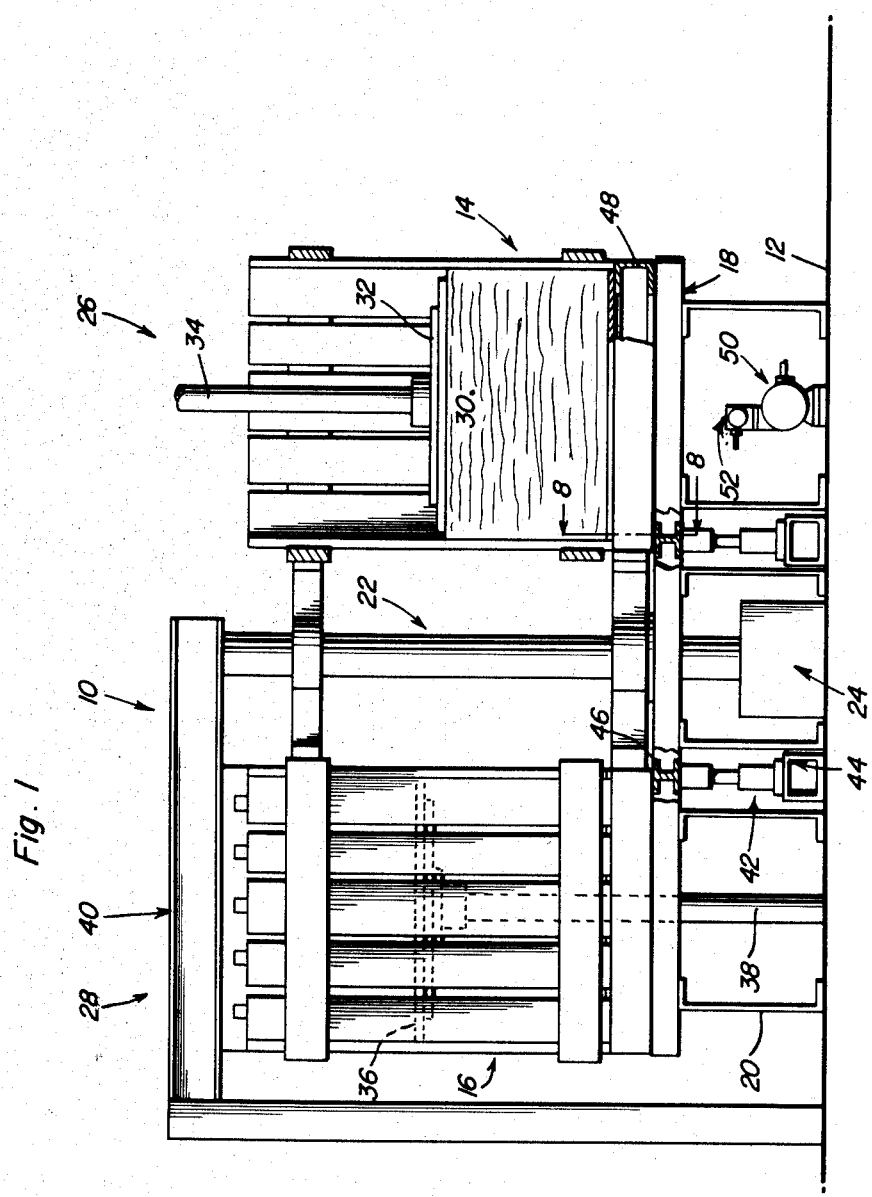
FIGURE 1 is a front elevational view with parts broken away and showing the apparatus of the present invention incorporated into a typical cotton gin baler.

Referring now to the drawings in detail, it will be observed from FIGURE 1, that the present invention is concerned with a cotton gin baler generally referred to by reference numeral 10 adapted to be supported on the floor 12 of a gin pit. The baler 10 may therefore include two baling boxes or containers 14 and 16 supported on a platform 18 which in turn is supported in spaced relation above the pit floor 12 by a plurality of spaced frame members 20. The baling boxes are rigidly interconnected with each other for rotation about a turning post 22 by means of any suitable turning mechanism 24 so that the baling boxes may be successively positioned at a loading station 26 and a pressing station 28. Ginned lint cotton is accordingly loaded into the baling box 14 at the loading station 26 after which the lint cotton 30 is compressed by the tramping ram 32 connected to a tramper shaft 34 which is driven from above through a predetermined stroke as is well known in the art. After the lint cotton is so compressed, within the loaded baling box 14, the turning mechanism 24 rotates the baling boxes so as to present an empty baling box at the loading station 26 following removal of a pressed bale therefrom. The previously loaded baling box 14 will then be in the pressing station 28 so that the ram 36 driven by the ram shaft 38 from below may compress the cotton material to bale size against the upper press frame portion 40.

In accordance with the present invention, the baling boxes with the cotton material therein, are weighed before the cotton is pressed as the tramper ram 32 approaches the upper end of its stroke. In this manner, any error introduced by the pressure exerted by the tramper, on the cotton material, will be avoided. Therefore, the weighing operation is restricted to this phase of the baler operation. The weighing apparatus therefore includes four assemblies 42 supported in spaced relation above the pit floor 12 by a base frame assembly 44 so that the supper ends of each assembly 42 will establish a horizontally level plane and support a pair of I-beams 46 just below the interconnected baling boxes 14 and 16 supported on the platform 18. The baling boxes are therefore provided with interconnected bottom frame members 48 which normally rest on the platform 18 and are elevated thereabove by a relatively small amount as shown by dotted lines in FIGURE 8 only during the weighing operation. Elevation of the assembly of frame members 48 and baling boxes by this small amount is accomplished through the four assemblies 42 when energized by fluid under pressure generated by the motor driven pump assembly 50. Thus, the load formed by the baling boxes is equally distributed by the beams 46 on the four elevating assemblies 42 arranged therebelow so that each pair of assemblies 42 support each beam 46 adjacent opposite ends thereof as shown in FIGURE 8. Mounted on the pump assembly 50 and hydraulically interconnected between the discharge thereof and the assemblies 42, is a four-way solenoid controlled valve assembly 52 through which fluid under pressure is supplied to the assemblies 42 for elevating the baling boxes off the platform in order to provide a weight measurement thereof.

Referring now to FIGURES 4 and 5 in particular, it will be observed that each of the assemblies 42 includes a fluid operated lift device 56 supported on the base frame 44 by a shim member 58. The lift device 56 is connected to a fluid cushion device 60 through which it engages the I-beam 46 in order to elevate the baling boxes off the platform by a slight amount as aforementioned. When so elevating the baling boxes off the platform, the static pressure developed within the fluid cushion device 60 when measured, will provide an indication of the weight of the cotton loaded into the baling boxes. Accordingly, elevation of the baling boxes off the platform as more clearly illustrated by dotted line in FIGURE 8, is regulated so as to enable the static pressure developed in the fluid cushion device 60 to reflect the weight of the cotton in the baling box. The fluid operated lift device 56 includes a fluid cylinder 62 enclosing a fluid chamber 64 within which a piston assembly 66 is reciprocable. The upper end of the cylinder 62 is closed by a pressure sealing head 68 through which the piston shaft 70 extends. Also, the piston assembly 66 is limited in its upward displacement to a position spaced from the head 68 by means of the limit sleeve 72 through which the piston shaft 70 extends. The piston assembly 66 may thereby be locked at the upper end of its stroke by fluid under regulated pressure supplied to the lower end of the chamber 64 by the supply conduit 74. The piston shaft 70 may on the other hand, be downwardly retracted when fluid under pressure is supplied to the upper end of the chamber 64 through the supply conduit 76 at which time fluid will be exhausted through the conduit 74.

The fluid cushion device 60 includes a cylinder 78 which is engageable with the I beams 46 for elevating the baling boxes off the platform during the upward stroke of the piston assembly 66 within the lift device 56. Accordingly, a piston assembly 80 is connected to the upper end of the piston shaft 70 and is reciprocable within the chamber 82 enclosed within the cylinder 78. The lower end of the cylinder 78 is therefore closed by a pressure sealing head 84. The chamber 82 may be initially charged with fluid at a predetermined pressure through a fluid charging and pressure measuring conduit 86 while air in the chamber 82 may be restrictively vented through a bleeder device 88. It will therefore be apparent, that lifting force applied by the fluid operated lift device 56, will compress the fluid within the chamber 82 of the fluid cushion device 60 before it elevates the loaded baling boxes off the platform, the maximum pressure so developed within the chamber 82 reflecting the weight of the load so lifted. The load of the baling boxes is therefore equally distributed as hereinbefore indicated on the four assemblies 42 of the lift devices 56 and fluid cushion devices 60.

As more clearly seen in FIGURE 6, fluid under pressure is supplied to and exhausted from each of the lift devices 56 in order to elevate and lower the load of the baling boxes during the weighing operation. The conduits 74 are interconnected through the couplings 90 and 92 to one of the outlet conduits 94 of the four-way solenoid valve assembly 52. The other outlet conduit 96 of the valve assembly 52 is interconnected by the couplings 98 and 100 to the conduits 76 of the lift devices. The fluid conduits 86 of the fluid cushion devices 60 are interconnected by the couplings 102 and 104 to a hand pump device 105 and to a pressure gauge 106. The hand pump device 105 is however interconnected with the coupling 104 to the conduits 86 through a quick-disconnect coupling 108 and a cut-off valve 110. In this manner, the pressure in the chambers 82 of the fluid cushion devices may be charged to a predetermined initial value as read on the pressure gauge 106, the maximum pressure then developed in the chamber 82 during the weighing operation also being indicated on the pressure gauge 106 in order to provide the weight measurement as aforementioned. The weighing operation is initiated and completed under control of the valve assembly 52 which therefore includes a pair of solenoid devices 112 and 114 through which hydraulic connections to the outlet conduits 94 and 96 are established respectively with the discharge from the pump assembly 50 and the exhaust line.

Referring now to FIGURES 2 and 3, it will be observed that as the tramper 32 approaches the upper end of the stroke a limit switch device 116 is actuated so as to initiate the weighing operation. The weighing operation is initiated by supply of fluid under pressure to the lower end of the chamber 64 of the lift devices 56 as diagrammatically illustrated in FIGURE 2. The baling boxes will thereby be lifted off of the platform 18 by a slight amount when the piston assembly within the lift device reaches the upper end of its stroke. As illustrated in FIGURE 3, the fluid within the chamber of the fluid cushion device 60 will then be compressed so as to develop a pressure indicative of the load supported on the fluid cushion device as reflected by the static pressure reading of the pressure gauge 106. This pressure reading will be maintained for a limited period of time or until the tramper 32 begins its downward stroke at which time the limit switch 118 is actuated so as to supply fluid under pressure to the upper end of the chamber in lift device 56 causing downward retraction thereof. The load on the fluid cushion device 60 is then relieved as the baling boxes are returned to their platform support.

Referring now to FIGURE 7, it will be observed that closure of the limit switch 116 will be operative to establish an energizing circuit from the battery 120 through the solenoid 112 so as to condition the valve assembly 52 by connecting the discharge line 122 of the pump assembly to the conduit 74 of the lift devices 56 in order to begin the weighing operation. The upward stroke of the lift devices will of course be limited to a predetermined amount while the lift pressure will also be limited to a regulated amount by the regulator valve 124. The lifting force developed will be sufficient to raise the load off the platform 18 in order to permit development of the maximum static pressure within the fluid cushion device 60. The static pressure reading on the pressure gauge 106 will therefore reflect the weight of cotton loaded into the baling boxes. The pressure developed in the fluid cushion devices may also be utilized as part of a signal system so as to inform the operator of the correct weight. Accordingly, the conduit 86 may also be connected to a pressure responsive potentiometer device 126 connected by an electrical circuit to a read-out component 128 in order to provide a remote weight measurement reading, the read-out component 128 also being connectible to an alarm device 130 so as to provide a signal for the operator when a predetermined weight is read out. The signal system may be adjusted in accordance with different weight requirements for the bales by charging the fluid cushion devices to a different initial pressure as indicated by the pressure gauge 106. The cut-off valve 110 and hand pump 105 are utilized for this purpose by operating pump 105 to increase the pressure in chamber 82 upon opening valve 110. When changing the initial pressure in chamber 82 as indicated, the dial of gauge 106 will, of course, have to be recalibrated in order to provide proper weight readings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a cotton baling machine having a receptacle supported on a platform and a tramper reciprocated through a predetermined stroke for compressing material loaded into said receptacle, means for gauging the weight of the material before compression thereof by the tramper comprising, power operated lift means for elevating said receptacle off the platform by a limited amount, fluid cushion means having a portion engageable with the receptacle and forming a fluid chamber with the lift means for supporting the receptacle on the lift means in an elevated position above the platform, and pressure gauging means operatively connected to the fluid chamber for measuring the static pressure developed therein when the receptacle is in said elevated position.

2. In a cotton baling machine having a receptacle supported on a platform and a tramper reciprocated through a predetermined stroke for compressing material loaded into said receptacle, means for gauging the weight of the material before compression thereof by the tramper comprising: lift means for elevating said receptacle off the platform by a limited amount, fluid cushion means operatively connected to the lift means for supporting the receptacle on the lift means, and pressure gauging means operatively connected to the fluid cushion means for measuring the static pressure developed therein when the receptacle is elevated by said limited amount, said lift means comprising fluid operated piston means connected to said fluid cushion means, means responsive to approach of the tramper to the end of said predetermined stroke for pressurizing the piston means to begin elevation of the receptacle, means responsive to departure of the tramper from said end of the stroke for retraction of the piston means relieving the pressure developed in the fluid cushion means, and means operatively connected to the lift means for limiting the pressurization and displacement of the piston means to regulate the amount of elevation of the receptacle sufficient to transfer support thereof from the platform to the fluid cushion means.

3. The combination of claim 2 including means operatively connected to the fluid cushion means for controllably charging thereof with fluid under pressure.

4. The combination of claim 1 including means operatively connected to the fluid cushion means for controllably charging thereof with fluid under pressure to regulate the calibration of the pressure gauging means.

5. In combination with a load handling machine having a platform supporting a receptacle thereon into which material is loaded and compressed, means for weighing the material loaded into the receptacle comprising, compressible support means having a portion engageable with said loaded receptacle for support thereof in an elevated position above the platform, lift means operatively connected to said compressible support means to form a cushion with said portion thereof measuring means operatively connected to the compressible support means for measuring compression of the cushion when supporting the receptacle in said elevated position to indicate the weight of the material.

6. In combination with a load handling machine having a platform supporting a receptacle thereon into which material is loaded and compressed, means for weighing the material loaded into the receptacle comprising, compressible support means adapted to support the loaded receptacle in an elevated position above the platform, lift means operatively connected to said compressible support means rendered operative for elevating said loaded receptacle to said elevated position transferring the load thereof to the compressible support means, means responsive to said transfer of the load for measuring compression of the compressible support means to indicate the weight of the material, a tramper for compressing the material loaded into the receptacle and means engageable by the tramper and operatively connected to the lift means for rendering the lift means operative only in response to withdrawal of the tramper from the material.

7. In combination with a baling press having a platform supporting a press box in a loading position and a pressing position and a tramping ram reciprocated for compressing material loaded into said press box in said loading position, means for weighing said material loaded into the press box comprising, power operated lift means fixedly mounted below the press box, compressible load supporting means operatively mounted on the lift means for displacement into engagement with the press box, operational control means operatively connected to the power operated lift means for sequentially effecting elevation and retraction of the press box above the platform in the loading position, limit control means engageable by the tramping ram and operatively connected to the operational control means for initiating said elevation of the lift means upon upward withdrawal of the tramping ram from the material, means responsive to transfer of the load of the press box from the platform to the load supporting means when elevated to the elevated position for measuring compression of the load supporting means, and means connected to the compression measuring means for calibration thereof to indicate the weight of the material loaded into the press box.

References Cited by the Examiner

UNITED STATES PATENTS

| | | | |
|---|---|---|---|
| 2,107,883 | 2/1938 | Benedek | 177—209 |
| 2,604,035 | 7/1952 | Shipley et al. | 100—99 |
| 2,732,113 | 1/1956 | Rice | 100—100 X |
| 2,756,983 | 7/1956 | Furcini | 177—209 |
| 2,793,850 | 5/1957 | Eckman | 177—209 |
| 3,107,744 | 10/1963 | Maugh | 177—209 |

LEO SMILOW, *Primary Examiner.*